(12) United States Patent
Ramanathan et al.

(10) Patent No.: US 7,369,975 B2
(45) Date of Patent: May 6, 2008

(54) METHOD AND APPARATUS FOR PATTERN BASED GENERATION OF GRAPHICAL USER INTERFACES (GUI)

(75) Inventors: Venkatesh Ramanathan, Pune (IN); Ulka Shrotri, Maharashtra (IN)

(73) Assignee: TATA Consultancy Services Limited (IN)

( * ) Notice: Subject to any disclaimer, the term of this patent is extended or adjusted under 35 U.S.C. 154(b) by 57 days.

(21) Appl. No.: 11/361,368

(22) Filed: Feb. 23, 2006

(65) Prior Publication Data

US 2006/0142989 A1 Jun. 29, 2006

Related U.S. Application Data

(62) Division of application No. 10/078,964, filed on Feb. 19, 2002, now Pat. No. 7,072,810.

(51) Int. Cl.
*G06F 9/445* (2006.01)
*G06F 13/00* (2006.01)

(52) U.S. Cl. ............... 703/2; 703/22; 703/25; 714/38; 717/114

(58) Field of Classification Search ............ 703/22–27, 703/2; 714/28, 38; 715/734; 717/114
See application file for complete search history.

(56) References Cited

U.S. PATENT DOCUMENTS 5,781,720 A * 7/1998 Parker et al. ............... 714/38
5,999,179 A * 12/1999 Kekic et al. ............... 715/734
6,377,993 B1 * 4/2002 Brandt et al. ............... 709/227
6,630,946 B2 * 10/2003 Elliott et al. ............... 715/781
6,675,371 B1 * 1/2004 York et al. ................. 717/114
2002/0186248 A1 12/2002 Ramanathan et al.
2003/0088536 A1 * 5/2003 Behnia ......................... 707/1

FOREIGN PATENT DOCUMENTS

IN 758/MUM/2001 6/2001

* cited by examiner

*Primary Examiner*—Thai Phan
(74) *Attorney, Agent, or Firm*—Central Coast Patent Agency, Inc.

(57) ABSTRACT

A software tool for modeling and generating user windows of a graphical user interface of a software application has a modeling component for creating models of window types and instances thereof, a conversion component for converting model information into ASCII code, a library component for storing reusable code, and a window generation component for generating graphical user interfaces windows. The tool is characterized in that graphical user interface windows are generated in a batch process wherein certain fields shared by the windows are automatically populated with the appropriate application code taken from or inherited from the wintype model.

12 Claims, 4 Drawing Sheets

METHOD AND APPARATUS FOR PATTERN BASED GENERATION OF GRAPHICAL USER INTERFACES (GUI)

CROSS-REFERENCE TO RELATED DOCUMENTS

This present patent application is a divisional application of U.S. patent application Ser. No. 10/078,964 which was filed on Feb. 19, 2002 now U.S. Pat. No. 7,072,810, which claims priority to Indian provisional patent application number 758/MUM/2001 filed on Aug. 6, 2001. The U.S. patent application Ser. No. 10/078,964 and entire specification and drawings of Indian patent application number 758/MUM/2001 are incorporated herein by reference.

FIELD OF THE INVENTION

The present invention is in the field of Software Development and pertains particularly to a method and apparatus for pattern based generation of graphical user interfaces (GUI).

BACKGROUND OF THE INVENTION

A graphical user interface (GUI) is an important part of most modern software applications. In a typical application development process one of the first items to be delivered to an end user is a GUI. It is part of the prototype that is shown to the end user during the requirements gathering phase (known in application development). A GUI captures the user's perspective of the application. Once the client approves a prototype, application development proceeds. During application development a GUI is enriched with code enabling various functions like navigation, server interaction, and enabling or disabling action buttons in an interface among other things. All of this capability takes a considerable amount of effort to develop and enable. Developers find it challenging to adhere to documented GUI standards. The process of verifying that all of the GUI windows adhere to pre-set GUI standards is largely manual and highly error prone.

Development of a GUI is typically done using one of many commercial development environments that are available. Some examples include Visual Basic, Visual Age and Power Builder. These environments require each of possibly multiple GUI windows to be configured individually. Individual treatment promotes difficulty in enforcing application GUI standards as described above. More importantly, however, similarities that do exist between different user interactions over multiple windows are not exploited. That is to say that common capabilities are individually painted in each window where they exist.

Although developers' tools such as those mentioned in the above paragraph provide very good support for quickly painting individual GUI screens, when it comes to writing GUI functionality and adhering to standards, the programmer must perform manually. Another drawback with prior-art development procedures is that GUI development proceeds independent of the associated application development making it difficult to ensure consistency between the application and the controls used to display the application values.

It has occurred to the inventor that many of the above-described problems in prior art could be overcome if certain GUI patterns could be identified and a tool was available that could generate code for instances of these GUI patterns.

Therefore, what clearly is needed is a method and apparatus that exploits existing functional similarities between various GUI windows of an application during development and generates the code to provide improved productivity and consistency in all of the application windows sharing common capabilities. Such a method and apparatus would enable developers to write less code and ensure that GUI standards are adhered to in a consistent manner across the board.

SUMMARY OF THE INVENTION

In a preferred embodiment of the present invention a software tool for modeling and generating user windows of a graphical user interface of a software application is provided, comprising a modeling component for creating models of window types and instances thereof, a conversion component for converting model information into ASCII code, a library component for storing reusable code, and a window generation component for generating graphical user interfaces windows. The tool is characterized in that graphical user interface windows are generated in a batch process wherein certain fields shared by the windows are automatically populated with the appropriate application code taken from or inherited from the wintype model.

In preferred embodiments the application code is Winform, Webform or Java. Also in preferred embodiments a wintype is a meta model and a GUI window is an instance of the wintype. Input to the tool may include winclasses and application classes.

In another aspect of the invention a method for modeling and generating user windows of a graphical user interface of a software application is provided, comprising steps of (a) providing at least one wintype and associated window specifications as input to a software tool; (b) identifying controls for each group box and table within the at least one wintype; (c) creating winclasses for each group box and table of the at least one wintype; (d) providing mapping between the window attributes and controls of the winclass; (e) identify other parameters available through interaction with window buttons; and (f) instantiate each GUI window as an instance of the wintype including arguments to parameters expected by the wintype.

In preferred embodiments in step (a) the wintype is a meta model. Further, in step (c), the winclasses may comprise the controls identified in step (b). In step (f) the GUI windows may be generated in a batch process, and in step (d) controls may include standard controls associated with labels.

In another aspect of the invention a system for modeling and generating GUI windows for software applications is provided, comprising a modeling framework for defining the data structure of the GUI windows, a set of GUI standards for governing GUI window behaviors, a GUI modeling tool for modeling GUI patterns and generating GUI instances of those patterns modeled, and a target platform for receiving generated GUI windows and facilitating their operation.

In preferred embodiments the modeling framework is a meta meta model framework having three levels of abstraction, and multiple GUI windows are generated in a batch process. The GUI windows may be instances of one or more GUI wintypes. Also the target platform may support one or more of Java server pages or Webforms or Wimforms.

BRIEF DESCRIPTION OF THE DRAWINGS FIGURES

DESCRIPTION OF THE PREFERRED EMBODIMENTS

In a preferred embodiment, the inventor provides a software tool and method for generating GUI windows during software application development wherein portions of window generation are automated and wherein the automated portion of the process leverages similarities between multiple generated windows to optimize production. The method and apparatus of the invention will be described in enabling detail below.

Figure 1:
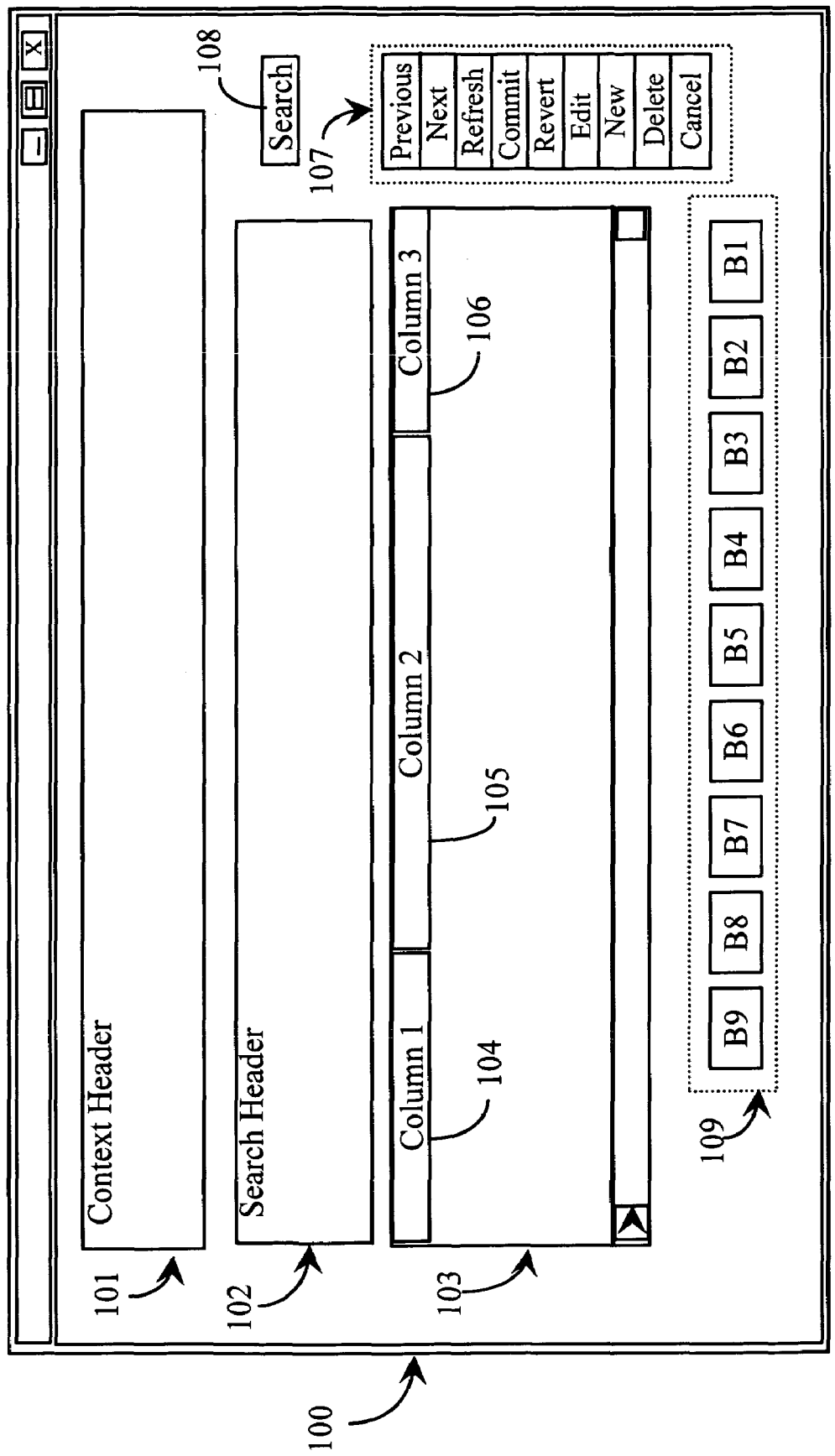
FIG. 1 is an exemplary screen shot of a GUI wintype under development according to an embodiment of the present invention.

FIG. 1 is an exemplary screen shot of a GUI wintype 100 under development according to an embodiment of the present invention. Wintype 100, also referred to herein as a GUI pattern is modeled according to a modeling framework known to the inventor as a meta meta model framework. The meta meta model framework has three hierarchical levels of model structure. The most abstract of these is the meta meta model followed by a meta model (instance of meta meta model) followed by a user model (instance of meta model).

Wintype 100 represents a meta model window type for a GUI of a specific application. Wintype 100 is an abstraction of a user model or actual GUI window. Wintype 100 consists of windows that can be opened, operations that can be called, function buttons to be placed, winclasses used in the window, application classes used in the window, and any other additional parameters that may be desired and applied thereto. In this example, wintype 100 comprises 4 controls. 2 of the just-described controls are also referred to herein as group boxes and given the element numbers 101 and 102. Group box 101 is labeled Context Header and is adapted as a control box for context of the wintype. Group box 102 is labeled Search Header and is associated with a search button illustrated herein as button 108 labeled Search. A third control is illustrated herein by a table 103. Table 103 has column buttons illustrated therein as Column 1 button 104, Column 2 button 105, and Column 3 button 106. The final of 4 controls is represented by an additional set of buttons 109 (B1-B9). Still an additional set of buttons 107 is provided and in some embodiments could be considered a 5$^{th}$ control for wintype 100.

In this particular example, wintype 100 takes 3 winclasses (not illustrated) as parameters. One winclass corresponds to group box 101, one winclass corresponds to group box 102 and one winclass corresponds to table 103. A winclass identifies the particular controls associated with a physical portion of wintype 100 that are to be displayed. For example, one winclass would identify the displayed controls within box 101, one winclass would identify the displayed controls within box 102, and one winclass would identify the columns that are to be displayed within table 103.

Other parameters of a wintype include text portions that are to be displayed on the interactive buttons, functions and windows to be called or opened respectively upon user invocation of a button, and a function that will be called in the event of user invocation of search function button 108.

As a meta model, the structure of wintype 100 is defined in terms of the controls it is composed of and any other wintype it may inherit attributes from. Therefore, the function or functions of a wintype specify the behavior of every GUI window that is an instance of the wintype. The specific code for the functionality of the wintype exists in a target language like Java or Winform. The target code specifies the parameters of wintype 100 such that the functionality will include invoking the search function 102 (function associated with the search button) upon click of search button 108 and populating table 103 with the data returned by the function. It will also include opening a new window or calling a new function at the mouse click of any of the buttons (109) at the bottom of wintype 100.

In a preferred embodiment, wintype 100 and any other wintypes, also referred to as patterns, are modeled. Then the specific application GUI windows are specified as instances of the appropriate patterns or wintypes. In this process, each application GUI window is classified as an instance of a specific pattern or wintype. The process also involves identifying the specific controls that need to be shown in each group box and/or columns of a table, defining a winclass corresponding to each group box and table, each defined winclass functioning as a view of application classes. Additionally as described above, button texts and functions to be called or windows to be opened at the click of a button are identified. Once all of this is performed, a GUI window can be modeled as an instance of appropriate wintype and with the identified winclasses and functional buttons as actual GUI parameters.

In a preferred embodiment, generating GUI windows as instances of wintypes is performed in batch process. One with skill in the art will recognize the terms winclass and application class as object modeling terms associated generally with a target modeling language like Java. However, other types of modeling languages can be utilized without departing from the spirit and scope of the present invention. GUI modeling according to wintype or pattern is performed with a novel tool provided for the purpose and described in detail below.

Figure 2:
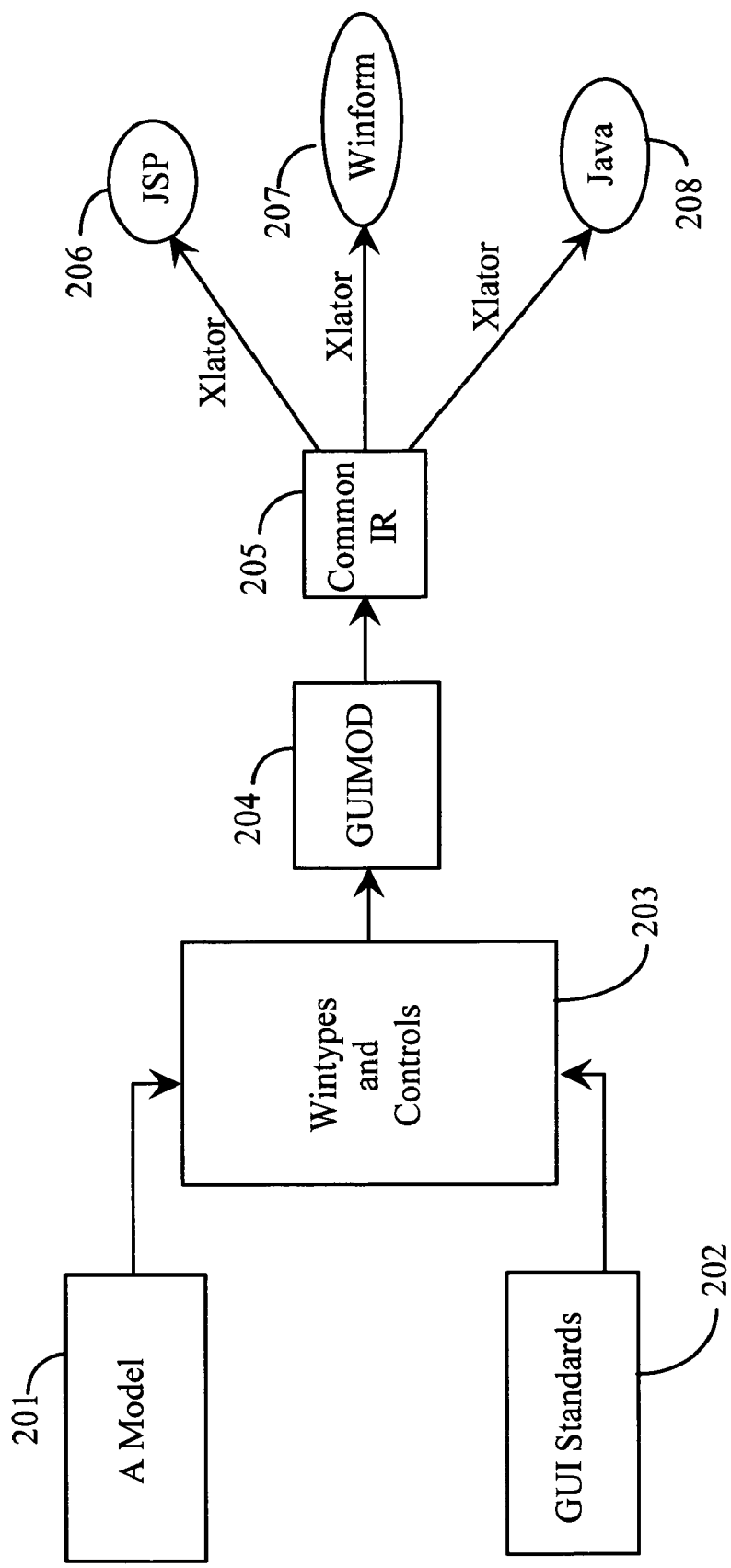
FIG. 2 is a block diagram illustrating a GUI modeling tool and supporting system according to one embodiment of the present invention.

FIG. 2 is a block diagram illustrating a GUI modeling tool and supporting system according to one embodiment of the present invention. A GUI modeling tool 204 is provided for generating GUI application windows that comprise a specific GUI for a software application. Input begins with GUI standards illustrated logically herein as a box labeled GUI Standards and given the element number 202. GUI standards 202 are the rules governing GUI functionality in a software application. Such rules may include standard operating procedures generic to an operating platform or system. A meta meta model structure is provided for a modeling framework and is illustrated logically herein as a box labeled A Model Structure and given the element number 201. The model structure 201 defines the functional data structure of patterns and user GUI instances that are later generated.

Directional arrows illustrate input of GUI Standards 202 and Model Structure 201 into an organized set of patterns and control inputs illustrated logically herein as a box labeled Wintypes and Controls and given the element number 203. As previously described, the method follows meta meta model framework known to the inventor. Wintypes or patterns as they are sometimes termed are modeled and controls are defined as described further above. This modeling and defining process is largely manual and is defined by parameter input including winclasses, application classes, and additional controls if required.

GUIMOD 204 takes in all of the input and generates a common intermediate representation (IR) logically illustrated herein by a box labeled Common IR and given the element number 205. IR 205 represents at least one GUI window model having all of the common controls, layouts, and attributes shared by all GUI user windows and all instances of individual windows as defined by a target language. In this support system there are 3 exemplary target platforms illustrated as possible implementation environments. For example, IR 205 gets translated (Xlator) to a Java Server Pages (JSP) platform in one instance. All of the required GUI windows (user instances) are guaranteed to have the same common features, functions and displayed values that automatically generated for each window instance instead of having to individually paint the shared items. Even though user instances (GUI windows) may vary from each other in certain attributes, because of the modeling and window generation based on pattern, things like common date presentation rules or perhaps customer name parameters will automatically appear in each appropriate field in each separate window as it is spawned.

Other possible platforms include Winform 207 and Java 208. In each instance Xlator translates the common IR 205 into the appropriate user instances of GUI windows that are fully operational and functional. It is important to note herein that a critical aspect of GUIMOD 204 is the ability to specify standard controls and labels that are used in the GUI windows. For example, if a calendar control (date control) is to be used for GUI fields accepting date values, it can be achieved by defining a type for date and mapping the type to the date control. GUIMOD 204 will guarantee that in every GUI window generated having one or more fields that accept date as input, the standard date control is used. Similarly, if "Customer Name" is an applied label to be used whenever the input to be taken by a control is the name of the customer, it can be achieved by defining a new type say "d_customer" and giving it a label "Customer Name". GUIMOD 204 guarantees that every generated GUI window field that accepts "d_customer" as input will have "Customer Name" as an associated label.

The method of the present invention is conducted in a batch process when generating GUI windows having one or more common attributes. One with skill in the art of coding windows will appreciate that much coding is eliminated from the process because of the fact that common attributes of many GUI windows are all painted in one batch process.

Figure 3:
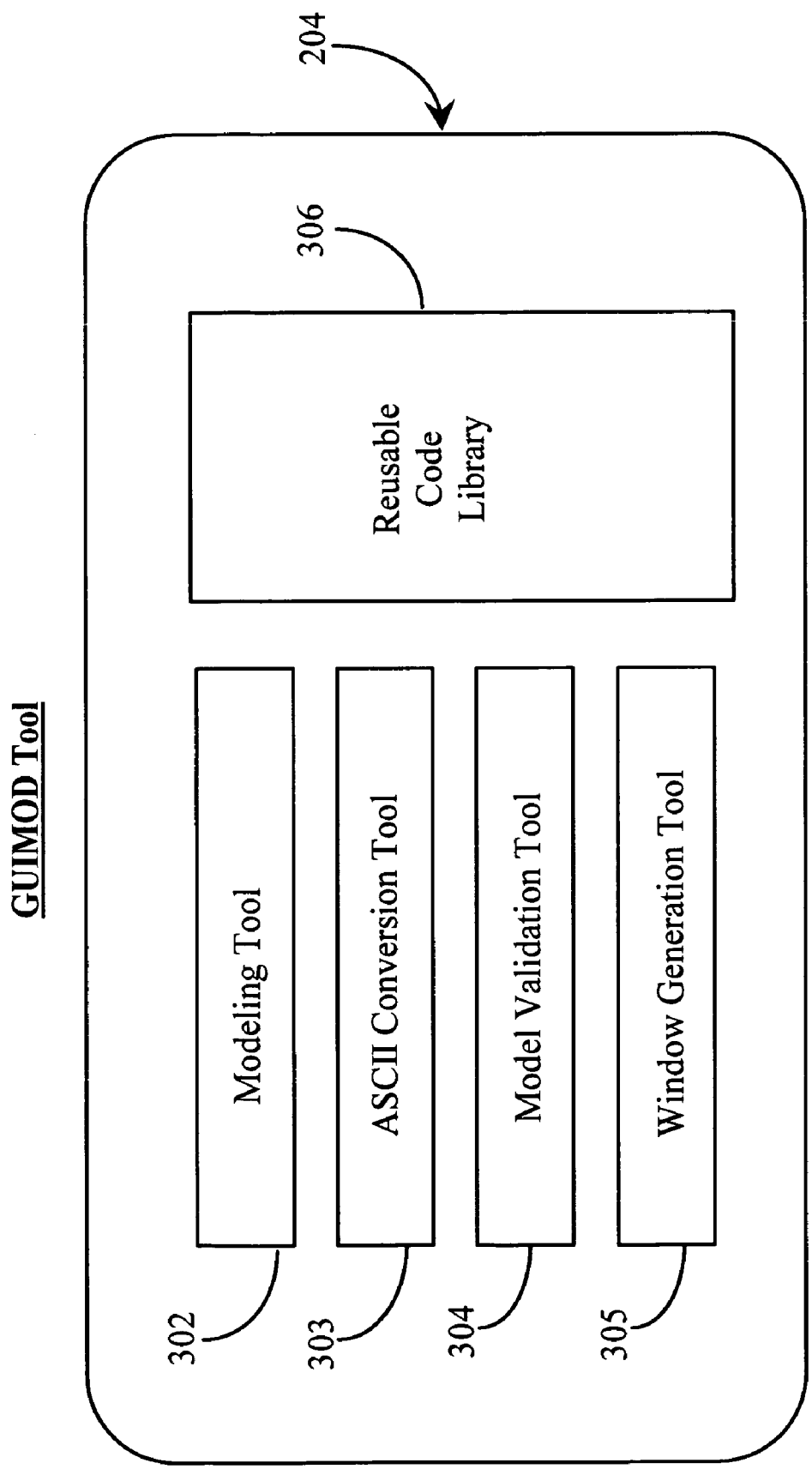
FIG. 3 is a block diagram illustrating components of the GUI modeling tool of FIG. 2.

FIG. 3 is a block diagram illustrating components of the GUI modeling tool of FIG. 2. GUIMOD 204 comprises a plurality of sub-tools that cooperate to enable the overall function of GUIMOD 204. A modeling tool 302 is provided within GUIMOD 204 and adapted to enable modeling of wintypes and so on. An ASCII conversion tool 303 is provided within GUIMOD 204 and is adapted to enable economic transmit of model and graphic information across a network utilizing low bandwidth. In this way model information can be applied at a remote platform. A model validation tool 304 is provided within GUIMOD 204 and is adapted to validate generated models to ensure compliance with all standards and so on. A window generation tool 305 is provided and adapted to generate the individual GUI windows from the input parameters. A reusable library of operating code 306 is provided and adapted as a repository of code for use in modeling.

GUIMOD 204 can generate all of the GUI windows for a software application and ensure that all shared attributes are the same in all of the windows through instantiation of the windows from an abstraction, which is a meta model. If an error occurs within one field of one window, it will occur in the same field in all of the GUI windows. Therefore, a fix to one field fixes all the same fields in all of the GUI windows exhibiting the field. The chances of human error associated with individually painting each window field in each GUI window are greatly reduced by batch generation of windows.

Figure 4:
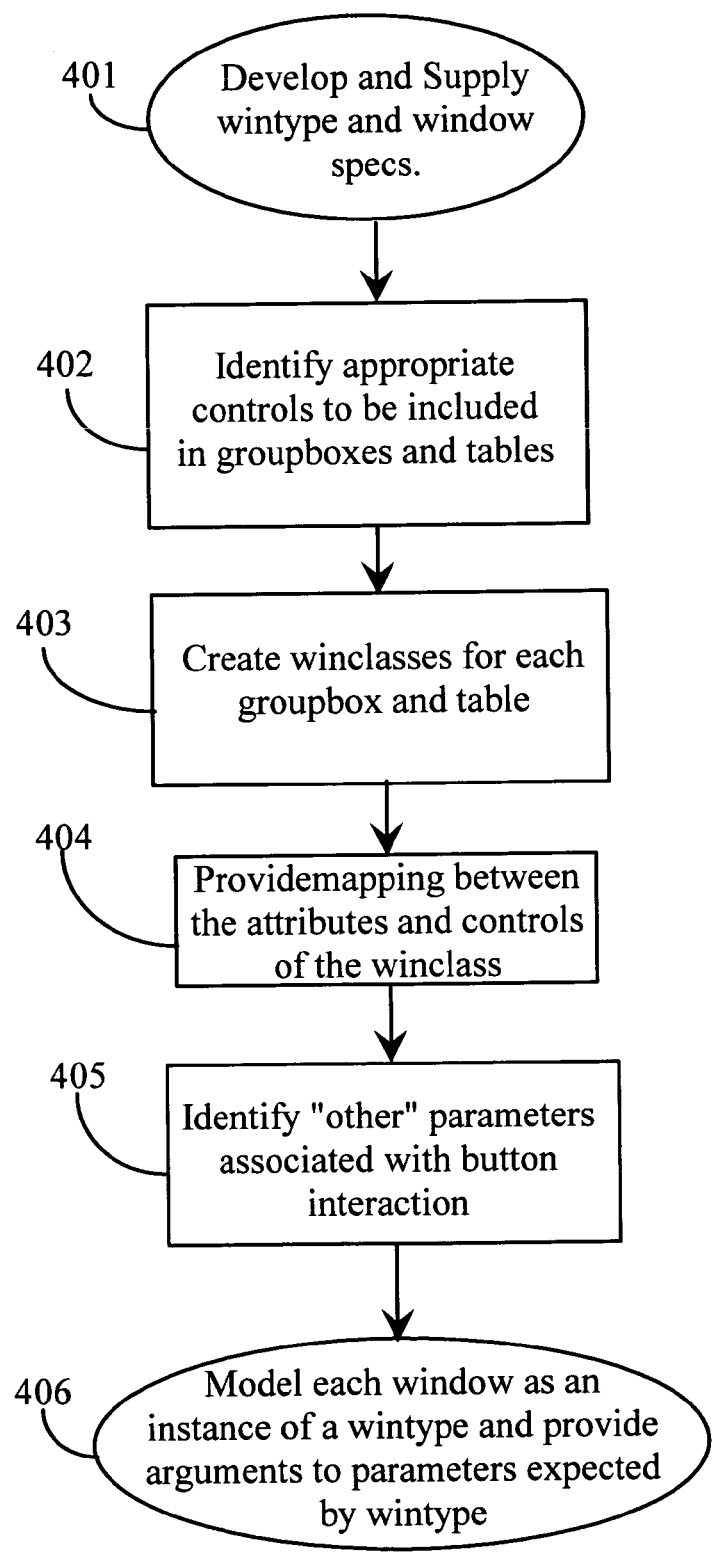
FIG. 4 is a process flow diagram illustrating developer steps for generating GUI windows and object-oriented fashion according to an embodiment of the present invention.

FIG. 4 is a process flow diagram illustrating developer steps for generating GUI windows and object-oriented fashion according to an embodiment of the present invention. At step 401, patterns or wintypes are modeled and instances (window models) thereof are created. At step 402, the appropriate controls included in the groupboxes and table of a wintype are identified and winclasses are created for each groupbox and table within a wintype at step 403. At step 404, mapping is provided between the controls and winclass attributes associated with the boxes and table of the wintype.

At step 405, other parameters not included in a winclass are identified such as operations called and new windows opened resulting from user interaction with function buttons within the window. At step 406, instantiate each GUI window (user instance) as an instance of a wintype including providing the arguments to parameters expected of the wintype model. It is noted herein that GUI windows are generated in a batch process. It is noted also that the method and apparatus of the invention can be used to generate simple GUIs or very complex GUIs comprising many separate user windows.

In the process, modeling of wintypes and coding of corresponding files is performed manually. Modeling of specific windows as instances of a wintype is also performed manually, including definition of winclass, controls, and so on. Once the models are in place the actual GUI window code in a target platform is automatically generated. Similarly, the layout of controls within a GUI window groupbox is automatically generated. The GUIMOD tool automatically determines and applies the appropriate control to be used for each winclass attribute in the model.

It will be apparent to one with skill in the art that the method and apparatus of the present invention can be used to model and generate GUI windows used in virtually any computer application running on any computer platform. In one embodiment, appropriate conversion interfaces can be utilized so that the process is platform independent meaning that modeling cam be performed on one platform and generated windows can run on a different platform. There are many possibilities. The present invention should be afforded the broadest scope under examination. The spirit and scope of the present invention is limited only to the following claims.

What is claimed is:

1. A software tool for modeling and generating user windows of a graphical user interface of a software application comprising:

a modeling component for creating models of window types and instances thereof;

a conversion component for converting model information into ASCII code;

a library component for storing reusable code; and a window generation component for generating graphical user interfaces windows;

characterized in that graphical user interface windows are generated in a batch process wherein certain fields shared by the windows are automatically populated with the appropriate application code taken from or inherited from the wintype model.

2. The software tool of claim 1 wherein the application code is Winform.

3. The software tool of claim 1 wherein application code is one of Java or Webform.

4. The software tool of claim 1 wherein the application code is Java Server Pages.

5. The software tool of claim 1 wherein a wintype is a meta model and a GUI window is an instance of the wintype.

6. A software tool of claim 1 wherein input to the tool includes winclasses and application classes.

7. A system for modeling and generating GUI windows for software applications comprising:
   a modeling framework for defining the data structure of the GUI windows; a set of GUI standards for governing GUI window behaviors;
   a GUI modeling tool for modeling GUI patterns and generating GUI instances of those patterns modeled; and
   a target platform for receiving generated GUI windows and facilitating their operation.

8. The system of claim 7 wherein the modeling framework is a meta meta model framework having three levels of abstraction.

9. The system of claim 7 wherein multiple GUI windows are generated in a batch process.

10. The system of claim 7 wherein generated GUI windows are instances of one or more GUI wintypes.

11. The system of claim 7 wherein the target platform supports one or more of Java server pages or Webforms.

12. The system of claim 7 wherein the target platform supports Winform.

* * * * *